United States Patent
Tu

(10) Patent No.: US 7,402,032 B2
(45) Date of Patent: Jul. 22, 2008

(54) MOLD APPARATUS AND MANUFACTURING METHOD FOR THE MOLD APPARATUS

(75) Inventor: Chien-Sheng Tu, Tucheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/307,726

(22) Filed: Feb. 18, 2006

(65) Prior Publication Data

US 2006/0197256 A1    Sep. 7, 2006

(30) Foreign Application Priority Data

Mar. 4, 2005   (CN) .................... 2005 1 0033492

(51) Int. Cl.
*B29D 11/00*   (2006.01)
*B29C 33/40*   (2006.01)

(52) U.S. Cl. .............. 425/190; 425/195; 425/470; 425/808; 264/1.32

(58) Field of Classification Search ............. 425/808, 425/325, 190, 193, 195, 394, 400, 406, 412, 425/423, 451.9, 468, 470; 249/117; 65/102, 65/305; 264/1.32, 219, 325
See application file for complete search history.

(56) References Cited

U.S. PATENT DOCUMENTS

| | | | |
|---|---|---|---|
| 3,938,775 A * | 2/1976 | Sarofeen ................. 249/102 |
| 4,569,807 A * | 2/1986 | Boudet ..................... 264/2.2 |
| 5,976,425 A * | 11/1999 | Nomura et al. ............ 264/2.2 |
| 6,355,190 B1 * | 3/2002 | Ojio et al. ................ 264/1.1 |
| 6,499,986 B1 * | 12/2002 | Saito ....................... 425/190 |
| 6,668,588 B1 * | 12/2003 | Hilton et al. ................. 65/37 |
| 6,907,756 B2 * | 6/2005 | Kozora ..................... 65/362 |
| 7,134,864 B2 * | 11/2006 | Yang et al. ............... 425/195 |
| 2003/0154744 A1 * | 8/2003 | Hirota et al. ............. 65/25.1 |
| 2006/0021386 A1 * | 2/2006 | Wang ....................... 65/323 |
| 2006/0073232 A1 * | 4/2006 | Wang ....................... 425/406 |
| 2006/0165828 A1 * | 7/2006 | Smilovici et al. ............ 425/78 |

FOREIGN PATENT DOCUMENTS

| | | | |
|---|---|---|---|
| JP | 62095210 A | * | 5/1987 |
| JP | 01184111 A | * | 7/1989 |
| JP | 02208012 A | * | 8/1990 |
| WO | WO 8911966 A1 | * | 12/1989 |

* cited by examiner

*Primary Examiner*—Philip C Tucker
*Assistant Examiner*—Dimple N Bodawala

(57) ABSTRACT

A mold apparatus (200) includes an upper mold (40) and a lower mold (50). The upper mold includes an upper guide sleeve (42), an upper mold seat (44), and an upper mold core (46). The lower mold includes a lower guide sleeve (52), a lower mold seat (54) and a lower mold core (56). The upper guide sleeve has a hole (422) defined thereof. The upper seat has an aperture (442) defined thereof. The upper mold seat is fixed below the upper guide sleeve. The lower guide sleeve has a hole (522) defined thereof. The lower seat has an aperture (542) defined thereof. The lower mold seat is fixed on the lower guide sleeve.

13 Claims, 2 Drawing Sheets

MOLD APPARATUS AND MANUFACTURING METHOD FOR THE MOLD APPARATUS

FIELD OF THE INVENTION

The present invention generally relates to a mold apparatus and, particularly, to a mold apparatus with precise coaxiality and a manufacturing method for the mold apparatus.

DESCRIPTION OF RELATED ART

With the development of multi-media technology, digital cameras and video cameras are being embraced by more and more consumers. There is an increasing demand for higher quality lens elements. The lens elements are made of transparent material such as glass or plastic. Whichever material lens elements are made of, each of the lens elements includes two opposite surfaces. In order to achieve a high image quality, the two opposite surfaces need to meet a coaxiality requirement. The lens elements having a high coaxiality need high-precision molds. Accordingly, it is very important that a mold apparatus can produce a lens that meets the coaxial requirement.

A typical mold apparatus 100 for molding the lens is represented in FIG. 2. The mold apparatus 100 includes an upper mold 10 and a lower mold 20. The upper mold 10 includes an upper mold core 12 and an upper mold seat 14. The lower mold 20 includes a lower mold core 22 and a lower mold seat 24. The upper mold core 12 and the lower mold core 22 are recessed at their adjoining surfaces. Together, the recesses form a cavity 26 corresponding to the shape of the product to be made. The upper and lower mold cores 12, 22 are surrounded by the upper and lower mold seats 14, 24 respectively, should have a same radius and should be aligned along their circumference. The upper mold core 12 has a runner 16 defined therein. In manufacturing the mold, the upper mold 14 and the lower mold 24 are fit together and bored as one unit in an effort to achieve greater coaxiality. However, a thickness of the upper mold 14 and the lower mold 24 fit together, is too thick. During the process of boring, it is difficult to ensure precise coaxiality between the upper mold 14 and the lower mold 24. During use in manufacturing, the molten transparent material is introduced into the mold apparatus through the runner 16. The lens elements are then obtained by molding. However, an incorrect alignment of the elements of the mold apparatus 100 may cause an eccentricity in tolerance. Further, the mold may cause an incorrect shape of the lens element so that the lens element may fail in a desired optical function.

Therefore, an improved mold apparatus is desired in order to overcome the above-described shortcomings.

SUMMARY OF INVENTION

In one embodiment thereof, a mold apparatus includes an upper mold and a lower mold. The upper mold includes an upper guide sleeve, an upper mold seat, and an upper core. The upper guide sleeve has a hole defined therein. The upper seat has an aperture defined therein. The upper mold seat is fixed below the upper guide sleeve and an axis of the hole of the upper guide sleeve aligns to an axis of the aperture of the upper mold seat. A portion of the upper mold core engages into the hole of the upper guide sleeve, another portion of the upper mold core engaging into the aperture of the upper mold seat. The lower mold includes a lower guide sleeve, a lower mold seat and a lower core. The lower guide sleeve has a hole defined thereof. The lower seat has an aperture defined thereof. The lower mold seat is fixed on the lower guide sleeve and an axis of the hole of the lower guide sleeve aligns to an axis of the aperture of the lower mold seat. A portion of the lower mold core engages into the hole of the lower guide sleeve, another portion of the lower mold core engaging into the aperture of the lower mold seat.

A method for manufacturing a mold apparatus comprises the steps of: placing an upper mold seat and a lower mold seat together to bore so as to form an aperture; placing an upper guide sleeve and a lower guide sleeve together to bore as to form a hole; mounting the upper mold seat and the upper guide sleeve, and an upper mold core inserted into the aperture of the upper mold seat and the hole of the upper guide sleeve so as to form an upper mold; mounting the lower mold seat and the lower guide sleeve, and an lower mold core inserted into the aperture of the lower mold seat and the hole of the lower guide sleeve so as to a lower mold; and placing the upper mold above the lower mold.

Other advantages and novel features will become more apparent from the following detailed description when taken in conjunction with the accompanying drawings.

BRIEF DESCRIPTION OF DRAWINGS

Many aspects of the mold apparatus can be better understood with reference to the following drawings. The components in the drawings are not necessarily to scale, the emphasis instead being placed upon clearly illustrating the principles of the mold apparatus. Moreover, in the drawings, like reference numerals designate corresponding parts throughout the several views.

DETAILED DESCRIPTION

The present invention relates to a molding apparatus which can meet a higher coaxial requirement. The molding apparatus may be used for manufacturing lenses by injection molding.

Figure 1:
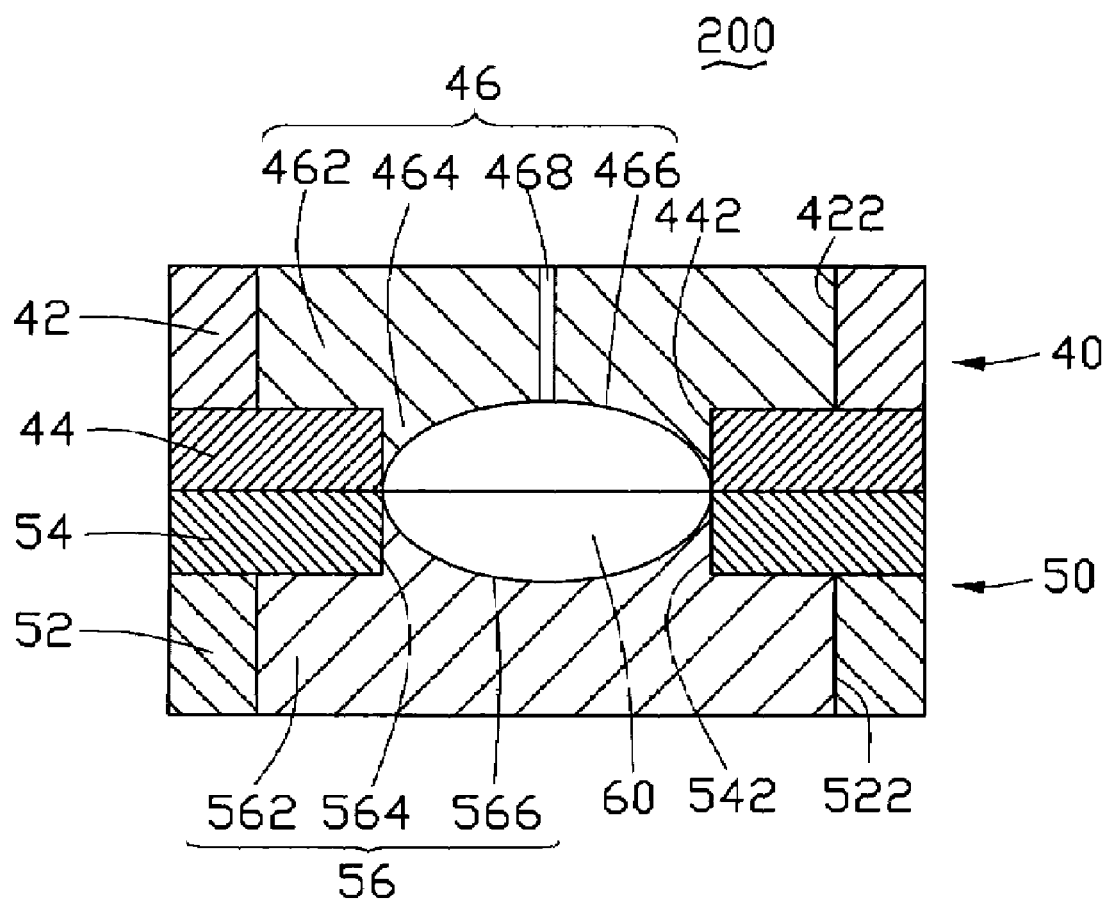
FIG. 1 is a cut-away view of an embodiment of a mold apparatus.
Figure 2:
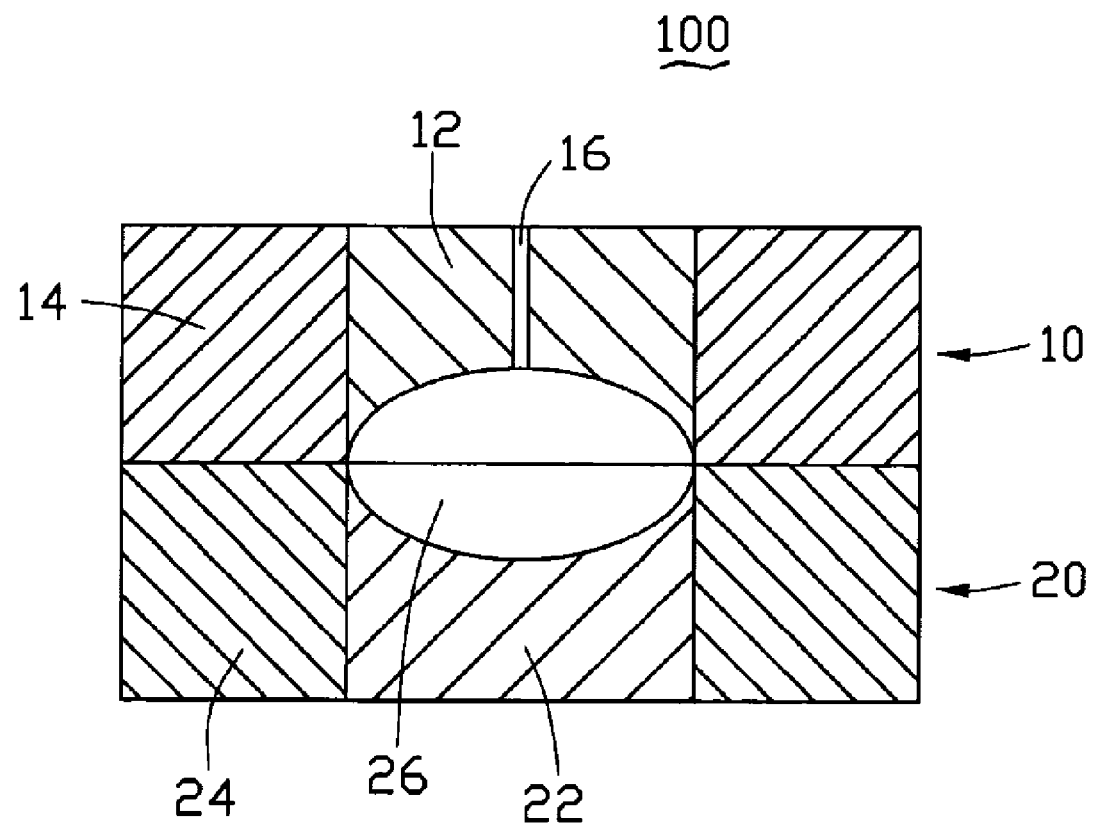
FIG. 2 is a cut-away view of a conventional mold apparatus.

Referring now to the drawings in detail, FIG. 1 shows a molding apparatus 200 in accordance with one embodiment. The mold apparatus 200 includes an upper mold 40 and a lower mold 50. The upper mold 40 and the lower mold 50 may be movable relative to each other. The upper mold 40 includes an upper guide sleeve 42, an upper mold seat 44, and an upper mold core 46. The upper guide sleeve 42 is disposed at a top end of the upper mold 40, and has a hole 422 defined therein. The upper mold seat 44 is disposed below, and contacts with, the upper guide sleeve 42. The upper mold seat 44 has an aperture 442, a diameter of which is smaller than that of hole 422 of the upper guide sleeve 42. The upper mold core 46 includes an enlarged diameter portion 462 and a reduced diameter portion 464 formed together. The reduced diameter portion 464 has an end surface 466, corresponding to one of opposite surfaces of the molded product. In this embodiment, the end surface 466 is concave. Alternatively, the end surface 466 can be of other shape depending on the outer profile of the product to be molded. The upper mold core 46 has a runner 468 defined in a middle thereof. The runner 468 communicates with the end surface 466.

The structure of the lower mold 50 is basically the same with the upper mold 40. The lower mold 50 includes a lower guide sleeve 52, a lower mold seat 54, and a lower mold core 56. The lower guide sleeve 52 is substantially identical to the upper guide sleeve 42, and the lower mold seat 54 is substantially identical to the upper mold seat 54. The lower guide sleeve 52 is disposed at a bottom end of the lower mold 50, and has a hole 522 defined therein. The lower mold seat 54 is disposed above and contacts with the lower guide sleeve 52. The lower mold seat 54 has an aperture 542, a diameter of which is smaller than that of the hole 522. The lower mold core 56 includes an enlarged diameter portion 562 and a reduced diameter portion 564 formed together. The reduced diameter portion 564 has an end surface 566, corresponding to the other of opposite surfaces of the molded product. The reduced diameter portions 564, 464 of the lower and upper mold core 56, 46 cooperatively define a cavity 60 therebetween, and the runner 468 is connected with the cavity 60 so that molten material can be introduced through the runner 468.

In machining, the upper guide sleeve 42 and the lower guide sleeve 52 are combined together and then bored at the same time to form the holes 422, 522 thereof. This can ensure a coaxiality of the upper guide sleeve 42 and the lower guide sleeve 52. In a similar manner, the upper mold seat 44 and the lower mold seat 54 are combined together and then bored at the same time to form the apertures 442, 542 thereof. This can ensure a coaxiality of the upper mold seat 44 and the lower mold seat 54. Because the mold seats 44, 55 and the guide sleeves 42, 52 are bored in separate combinations their thickness are not excessive and a greater precision is achieved in the boring process. Accordingly, the holes 422, 522, the apertures 442, 542 may be processed by a more precise way of boring such as cutting by laser, or milling boring. These highly precise ways may further enhance the coaxiality between the upper mold 40 and the lower mold 50.

In assembly, the upper guide sleeve 42 is disposed above the upper mold seat 44, with an axis of the hole 422 being aligned to an axis of the aperture 442. The upper guide sleeve 42 is fixed with the upper mold seat 44 by means of, e.g., bolts. Then, the upper mold core 46 is inserted into the hole 442 of the upper guide sleeve 42. The enlarged diameter portion 462 engages in the upper guide sleeve 42, and the reduced diameter portion 464 engages in the upper mold seat 44. Accordingly, the upper mold core 46 is locked between the upper guide sleeve 42 and the upper mold seat 44. The assembly of the lower mold 50 is similar to that of the upper mold 40, and therefore the assembly process of the lower mold 50 is not detailed.

In use, the upper mold 40 and the lower mold 50 are mounted together in the injection molding machine. The injection mold machine can control an open and closed operation between the upper mold 40 and the lower mold 50. To mold a product, the upper mold 40 is closed relative to the lower mold 50, the molten material is introduced into the cavity 60 through the runner 468. After cooling the mold, the material solidifies to form the product. The molds 40, 50 are accurately aligned relative to each other and the lens thus manufactured has the desired quality and shape.

In alternative embodiments, the upper mold core 46 and the lower mold core 56 may have other shapes according to need.

As described above, the preferred embodiment provides the mold apparatus 200, which has a high coaxiality. It is, however, to be understood that the mold apparatus 200 could potentially be useful in other applications (e.g., a casting mold, a compression mold). The invention is also used for the manufacture of a variety of lens singly or in great numbers, such as an aspheric lens, a cylindrical lens, a meniscus lens, or a fresnel lens.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mold apparatus, comprising:
an upper mold, the upper mold including an upper guide sleeve, an upper mold seat, and an upper core, the upper guide sleeve having a hole defined therein, the upper seat having an aperture defined thereof, and the upper mold seat fixed below the upper guide sleeve and an axis of the hole of the upper guide sleeve aligning to an axis of the aperture of the upper mold seat, a portion of the upper mold core engaging into the hole of the upper guide sleeve, another portion of the upper mold core engaging into the aperture of the upper mold seat; and
a lower mold, the lower mold including a lower guide sleeve, a lower mold seat, and a lower core, the lower guide sleeve having a hole defined thereof, the lower seat having an aperture defined thereof, and the lower mold seat fixed on the lower guide sleeve and an axis of the hole of the lower guide sleeve aligning to an axis of the aperture of the lower mold seat, one end portion of the lower mold core engaging into the hole of the lower guide sleeve, the other end of the lower mold core engaging into the aperture of the lower mold seat.

2. The mold apparatus as claimed in claim 1, wherein the upper mold core and the lower mold core respectively include an enlarged diameter portion and a reduced diameter portion, the enlarged diameter portion and the reduced diameter portion are cylindrical and are formed together.

3. The mold apparatus as claimed in claim 2, wherein the upper guide sleeve and the upper mold seat, as a first set, and the lower guide sleeve and the lower mold seat, as a second set, are respectively fixed together by bolts.

4. The mold apparatus of claim 1, wherein the upper mold seat and the lower mold seat together are coaxially bored so as to form the aperture of the upper mold seat and the aperture of the lower mold seat.

5. The mold apparatus of claim 1, wherein the upper guide sleeve and the lower guide sleeve together are coaxially bored so as to form the hole of the upper sleeve and the hole of the lower guide sleeve.

6. A mold apparatus comprising:
an upper mold, the upper mold including:
an upper mold core having an upper mold surface;
an upper guide sleeve engaged around a first portion of the upper mold core; and
an upper mold seat engaged round a second portion of the upper mold core and abutting against the upper guide sleeve; and
a lower mold, the lower mold including:
a lower mold core having a lower mold surface, the lower mold surface being coaxial with the upper mold surface when the upper mold and the lower mold are fit together;
a lower guide sleeve engaged around a first portion of the lower mold core; and
a lower mold seat engaged around a second portion of the lower mold core and abutting against the lower guide sleeve, wherein the upper mold seat and the lower mold seat together are coaxially bored and are thereby configured for receiving the second portion of the upper mold core and the second portion of the lower mold core.

7. The mold apparatus of claim 6, wherein the upper and lower mold seats contact with each other when the upper mold and lower mold are fit together.

8. The mold apparatus of claim 6, wherein the upper guide sleeve defines a first hole for receiving the upper mold core, and the lower guide sleeve defines a second hole for receiving the lower mold core, the first hole being coaxial with the second hole.

9. The mold apparatus of claim 8, wherein the upper mold seat defines a first aperture for receiving the upper mold core, and the lower mold seat defines a second aperture for receiving the lower mold core, the first and second holes, and the first and second apertures being coaxial.

10. The mold apparatus of claim 6, wherein the upper mold seat defines a first aperture for receiving the upper mold core, and the lower mold seat defines a second aperture for receiving the lower mold core, the first aperture being coaxial with the second aperture.

11. The mold apparatus of claim 6, wherein the first and second portions of the upper mold core have distinct outer diameters.

12. The mold apparatus of claim 6, wherein the first and second portions of the lower mold core have distinct outer diameters.

13. The mold apparatus as claimed in claim 6, wherein the upper guide sleeve is fixed with the upper mold seat, the lower guide sleeve is fixed with the lower mold seat, and the upper guide sleeve and the lower guide sleeve are machined by means of cutting or milling boring.

* * * * *